March 2, 1926.  
A. L. JOHNSON ET AL  
1,575,166  
DOUBLE SCREW JACK  
Filed April 8, 1925
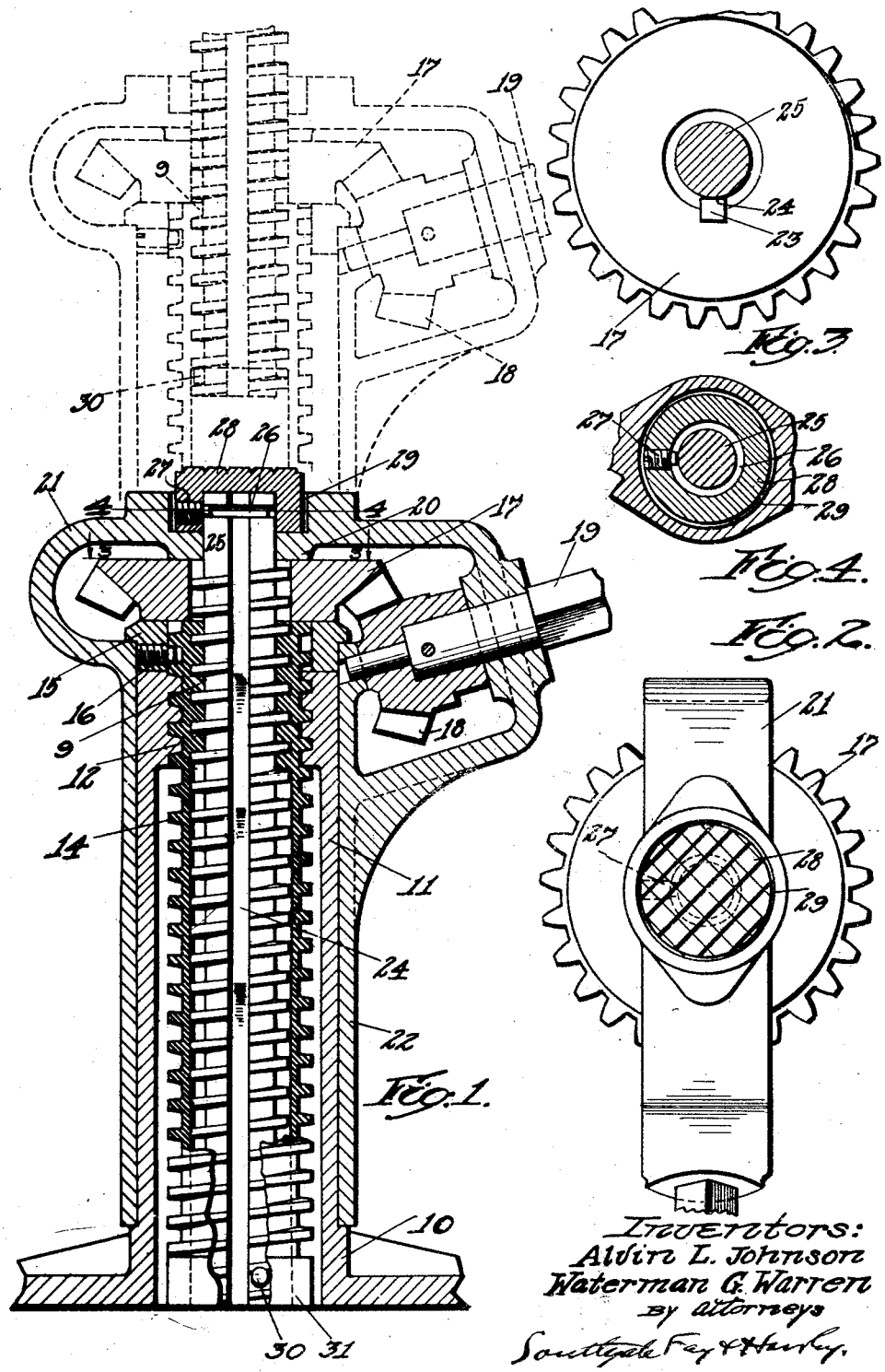
Inventors:  
Alvin L. Johnson  
Waterman G. Warren  
By attorneys  
Southgate Fay & Hurly Patented Mar. 2, 1926.

1,575,166

UNITED STATES PATENT OFFICE.

ALVIN L. JOHNSON, OF SPRINGFIELD, AND WATERMAN GOULDING WARREN, OF HOLDEN, MASSACHUSETTS.

DOUBLE-SCREW JACK.

Application filed April 8, 1925. Serial No. 21,655.

*To all whom it may concern:*

Be it known that we, ALVIN L. JOHNSON and WATERMAN GOULDING WARREN, both citizens of the United States, respectively residing at Springfield and Holden, in the counties of Hampden and Worcester and State of Massachusetts, have invented a new and useful Double-Screw Jack, of which the following is a specification.

This invention relates to a jack having two screws one inside the other. The principal objects of the invention are to provide a direct connection from the operating gear to the inner screw so that the inner screw will be raised to its full height before the outer screw is operated, thus providing for the operation of the jack with the smallest amount of power at the begining of the upward motion, which is at a time when, in most cases, the load is being raised through its greatest distance; also to provide a construction in which the jack can be adjusted by turning the base so as to get it approximately to the height necessary for starting it; and to provide a jack which can be contained in a small casing.

Reference is to be had to the acompanying drawings, in which

Fig. 1 is a vertical central sectional view of a jack constructed in accordance with this invention showing it extended in dotted lines;

Fig. 2 is a plan of the same;

Fig. 3 is a horizontal sectional view on the line 3—3 of Fig. 1; and

Fig. 4 is a horizontal sectional view on the line 4—4 of Fig. 1.

The jack comprises a base 10 having a cylindrical standard 11 provided with an internally screw-threaded portion 12 extending down from the top a considerable distance. The passage in this is enlarged below. In this screw thread operates a hollow screw 14 threaded outside throughout its length and threaded inside at the top at 9 for a distance shorter than the length of the thread 12.

At the top of the standard 11 is a collar 15 having a set screw 16 located in radial position and fastening it to the thread of the screw 14 and having a top flange projecting over the adjacent top surface of a frame 21. On top of the collar is an operating gear 17 meshing with a pinion 18 on a shaft 19 by which the gear is operated.

This gear rests between the collar 15 and a bottom surface 20 on the top of the frame 21 which has a space in which the two gears 17 and 18 are located. This frame is shown with a cylindrical flange 22 which extends down to form a guide which encloses the parts and protects them from dust. The collar 15 rotates on the standard 11 with the screw.

The gear 17 is provided with a key or internal radial projection 23 extending into a central perforation through it. This key engages in a key-way 24 in an inner screw 25 so as to cause this screw always to turn with the gear. This screw is threaded into the internal thread 9 on the screw 14 for a purpose to be described. At the top, this screw is provided with a circular grove 26 and into it extends a pin or screw 27 carried on a swivel head 28 constituting the work support. This head is arranged loosely so as to be able to turn relatively to the screw, or rather to remain stationary while the screw turns. I have shown the top of the frame 21 as provided with a recess 29 for the work rest 28.

At the bottom the screw 25 is provided with a pin 30 in one of the threads or with some other obstruction to prevent this screw turning up out of the internal screw thread 9 and the parts becoming separated. The bottom of the screw 14 on the outside is also provided with a cylindrical portion 31 unthreaded for a similar purpose.

This constitutes a compact jack and one that does not require excessive sizes of the parts and in operation the movement is continuous. As the gear 17 turns, the inner screw 25 necessarily moves upwardly on account of its connection with the inner screw thread 9 of the screw 14 which really constitutes a nut. This screw is not positively held stationary but on account of the fact that there are so many more threads in engagement on its exterior than on its interior and on account of the larger thread outside, it will ordinarily remain stationary, which results in the raising of the screw 25 to its limit. But when that limit is reached, the pin 30 engages the lower thread 9 on the inside of the screw 14 and therefore these two screws turn together positively with the gear 17 and the outer screw goes upwardly in its thread 12 taking with it the frame 21 and gears. There is no lost time in changing from one motion to the other, no change in the rapidity of motion, no spring pawl or the like to operate or possibly get out of order, and in fact, the ordinary operator will not know that any change is taking place except that it begins to turn harder. The same is true on the downward motion. The inner screw is operated directly by the gear to rise without operating the outer screw. This direct operation is a simplification and reduces the friction.

In the use of the device, it is desirable to set the jack before it is put under the car so that it will be of approximately the right height and this can be done by holding it by the guide 22 and turning the base 10. It will be seen that if, for any reason, the thread of the inner screw does not turn easily in the outer screw, on account of there being more resistance there than on the outer thread, still the jack will operate all right as it makes no difference whether both screws go up at once during the first part of the operation or later. In other words, the efficiency of the jack is not lost if the inner screw should bind. This, however, is not likely to happen.

Although we have illustrated and described only a single form of the invention, we are aware of the fact that modifications can be made therein by any person skilled in the art without departing from the scope of the invention as expressed in the claims. Therefore we do not wish to be limited to all the details of construction herein shown and described but what we do claim is:—

1. In a jack of the character described, the combination of an operating gear having a passage therethrough, an inner screw located in said passage and movable vertically therethrough, means whereby the inner screw is caused to rotate positively with the gear, a nut below the gear for the inner screw to cause it to rise or descend as it rotates, and means whereby said nut will rise or descend with the rotation of the gear after the inner screw has reached the limit of its travel.

2. In a jack, the combination with a standard screw-threaded internally, of a screw operating in said screw thread and having a passage therethrough also threaded, an inner screw threaded in said passage and having a longitudinal key-way, a gear rotatably mounted at the top of the standard and having a passage therethrough for the inner screw and a projection for engaging the keyway, means for operating the gear, and means at the bottom of the inner screw for engaging the bottom of the inner thread on the outer screw when the inner screw rises to its limiting position, whereby from that time on the outer screw and inner screw will turn together and both rise in accordance with the thread on the outside of the outer screw.

3. In a jack, the combination of a standard having a vertical passage therethrough with an internal thread extending for a distance therealong, a hollow screw mounted in said thread and having an internal thread extending for a shorter distance therealong, an inner screw mounted in the second internal thread and having a work rest freely rotatable on the top thereof, a gear resting on the top of the standard and having a passage therethrough for the smaller screw, said gear and smaller screw being splined together so as to permit longitudinal motion of the screw and prevent relative rotation of the screw and gear, whereby when the gear is turned the hollow screw will act as a stationary nut to cause the inner screw to rise as it turns, said inner screw having means at the bottom thereof for preventing its screwing out of its nut, whereby when said means comes into action the two screws will turn together with gear and the outer screw will move upwardly, taking the frame with it.

4. In a jack, the combination with a standard screw-threaded internally, of a screw operating in said screw thread and having a passage therethrough also threaded, an inner screw threaded in said passage, means for operating the inner screw, and means at the bottom of the inner screw for engaging the bottom of the inner thread on the outer screw when the inner screw rises to its limiting position, whereby from that time on the outer screw and inner screw will turn together and both rise in accordance with the thread on the outside of the outer screw.

In testimony whereof we have hereunto affixed our signatures.

ALVIN L. JOHNSON.
WATERMAN GOULDING WARREN.